US011302318B2

(12) United States Patent
Mitsui et al.

(10) Patent No.: US 11,302,318 B2
(45) Date of Patent: Apr. 12, 2022

(54) SPEECH TERMINAL, SPEECH COMMAND GENERATION SYSTEM, AND CONTROL METHOD FOR A SPEECH COMMAND GENERATION SYSTEM

(71) Applicant: YAMAHA CORPORATION, Hamamatsu (JP)

(72) Inventors: Daisuke Mitsui, Hamamatsu (JP); Takayuki Inoue, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 200 days.

(21) Appl. No.: 16/555,313

(22) Filed: Aug. 29, 2019

(65) Prior Publication Data

US 2019/0392832 A1 Dec. 26, 2019

Related U.S. Application Data (63) Continuation of application No. PCT/JP2017/012167, filed on Mar. 24, 2017.

(51) Int. Cl.
*G10L 15/22* (2006.01)
*G10L 15/02* (2006.01)
*G10L 15/08* (2006.01)

(52) U.S. Cl.
CPC ............. *G10L 15/22* (2013.01); *G10L 15/02* (2013.01); *G10L 15/08* (2013.01);
(Continued)

(58) Field of Classification Search
CPC ......... G10L 15/00; G10L 15/02; G10L 15/08; G10L 15/22; G06F 3/167
(Continued)

(56) References Cited

U.S. PATENT DOCUMENTS 9,368,114 B2 * 6/2016 Larson .............. H04M 1/72403
9,413,891 B2 * 8/2016 Dwyer .............. H04M 3/42221
(Continued)

FOREIGN PATENT DOCUMENTS

JP 2008028885 A 2/2008
JP 2010230852 A 10/2010
(Continued)

OTHER PUBLICATIONS

International Search Report issued in Intl. Appln. No PCT/JP2017/012167 dated May 30, 2017. English translation provided.
(Continued)

*Primary Examiner* — Susan I McFadden
(74) *Attorney, Agent, or Firm* — Rossi, Kimms & McDowell LLP (57) ABSTRACT

A speech command generation system includes multiple speech terminals that communicate with each other via a network. Each terminal, which includes a sound pickup device and a speaker. At least one of the terminals converts local picked up sound data to text data, while delaying outputting of the sound data to a remotely communicating terminal, and determines whether the text data includes a trigger word. When the text data includes the trigger word, the outputting of the sound data to the remotely communicating terminal is inhibited.

18 Claims, 5 Drawing Sheets

(52) U.S. Cl.
CPC .. *G10L 2015/025* (2013.01); *G10L 2015/027* (2013.01); *G10L 2015/088* (2013.01)

(58) Field of Classification Search
USPC ......................................................... 704/275
See application file for complete search history.

(56) References Cited

U.S. PATENT DOCUMENTS

| | | | |
|---|---|---|---|
| 10,078,487 B2* | 9/2018 | Gruber | G06F 3/165 |
| 10,313,520 B2* | 6/2019 | Dwyer | G10L 15/26 |
| 2015/0112667 A1 | 4/2015 | Kozuka | |
| 2015/0312419 A1 | 10/2015 | Yoneda | |
| 2016/0125883 A1 | 5/2016 | Koya | |
| 2016/0248989 A1* | 8/2016 | Cross | H04N 21/2365 |
| 2018/0130467 A1 | 5/2018 | Chikuri | |

FOREIGN PATENT DOCUMENTS

| | | |
|---|---|---|
| JP | 2013168845 A | 8/2013 |
| JP | 2015080195 A | 4/2015 |
| JP | 2015215601 A | 12/2015 |
| WO | 2014208231 A1 | 12/2014 |
| WO | 2017042906 A1 | 3/2017 |

OTHER PUBLICATIONS

Written Opinion issued in Intl. Appln. No. PCT/JP2017/012167 dated May 30, 2017.
Office Action issued in Japanese Appln No. 2019-506918 dated Apr. 21, 2020. English translation provided.
English translation of Written Opinion issued in Intl. Appln. No. PCT/JP2017/012167 dated May 30, 2017, previously cited in IDS filed Aug. 29, 2019.
International Preliminary Report on Patentability issued in Intl. Appln. No. PCT/JP2017/012167 dated Oct. 3, 2019. English translation provided.

* cited by examiner

SPEECH TERMINAL, SPEECH COMMAND GENERATION SYSTEM, AND CONTROL METHOD FOR A SPEECH COMMAND GENERATION SYSTEM

CROSS-REFERENCE TO RELATED APPLICATION

The present application is continuation of International Application No. PCT/JP2017/012167 filed on Mar. 24, 2017. The contents of the application are hereby incorporated by reference into this application.

BACKGROUND

1. Field

The present disclosure relates to a speech terminal, a speech command generation system, and a control method for a speech command generation system.

2. Description of the Related Art

In Japanese Patent Application Laid-open No. 2008-28885, there is disclosed a technology that allows a driver in a vehicle and the other person on the phone outside the vehicle to hold a telephone conversation over speech terminals. There is also disclosed a technology that allows the other person on the phone to adjust sound quality and a volume of a voice in the telephone conversation by a speech command.

With a related-art speech terminal, when the other person on the phone performs an operation by a speech command, a speech of the other person on the phone that is irrelevant to a conversation reaches a driver, which hinders the conversation therebetween.

SUMMARY

The present disclosure has been made in view of the above-mentioned problem, and one of objects thereof is to achieve a configuration for inhibiting a speech used to perform an operation by a speech command from being transmitted to the other person on the phone.

A speech terminal according to at least one embodiment of this disclosure includes: an output controller configured to acquire sound data to output the sound data; and a speech recognizer configured to perform speech recognition on the sound data under a state in which transmission of the sound data is delayed, and inhibit the output controller from outputting the sound data based on a result of the speech recognition.

A speech command generation system according to at least one embodiment of this disclosure includes: an output controller configured to acquire sound data to output the sound data; a trigger word determiner configured to determine whether a trigger word is included in the sound data under a state in which transmission of the sound data is delayed, and inhibit the output controller from outputting the sound data based on a result of the determination; and a server configured to generate a command signal through use of the sound data.

A control method for a speech command generation system according to at least one embodiment of this disclosure includes: acquiring, with at least one processor operating with a memory device in the system, sound data to output the sound data; delaying, with the at least one processor operating with the memory device in the system, transmission of the sound data; determining whether a trigger word is included in the sound data; and inhibiting, with the at least one processor operating with the memory device in the system, the output of the sound data based on a result of the determination.

DETAILED DESCRIPTION

First Embodiment

A first embodiment of the present disclosure is described below with reference to the accompanying drawings.

[Speech Command Generation System 300]

Figure 1:
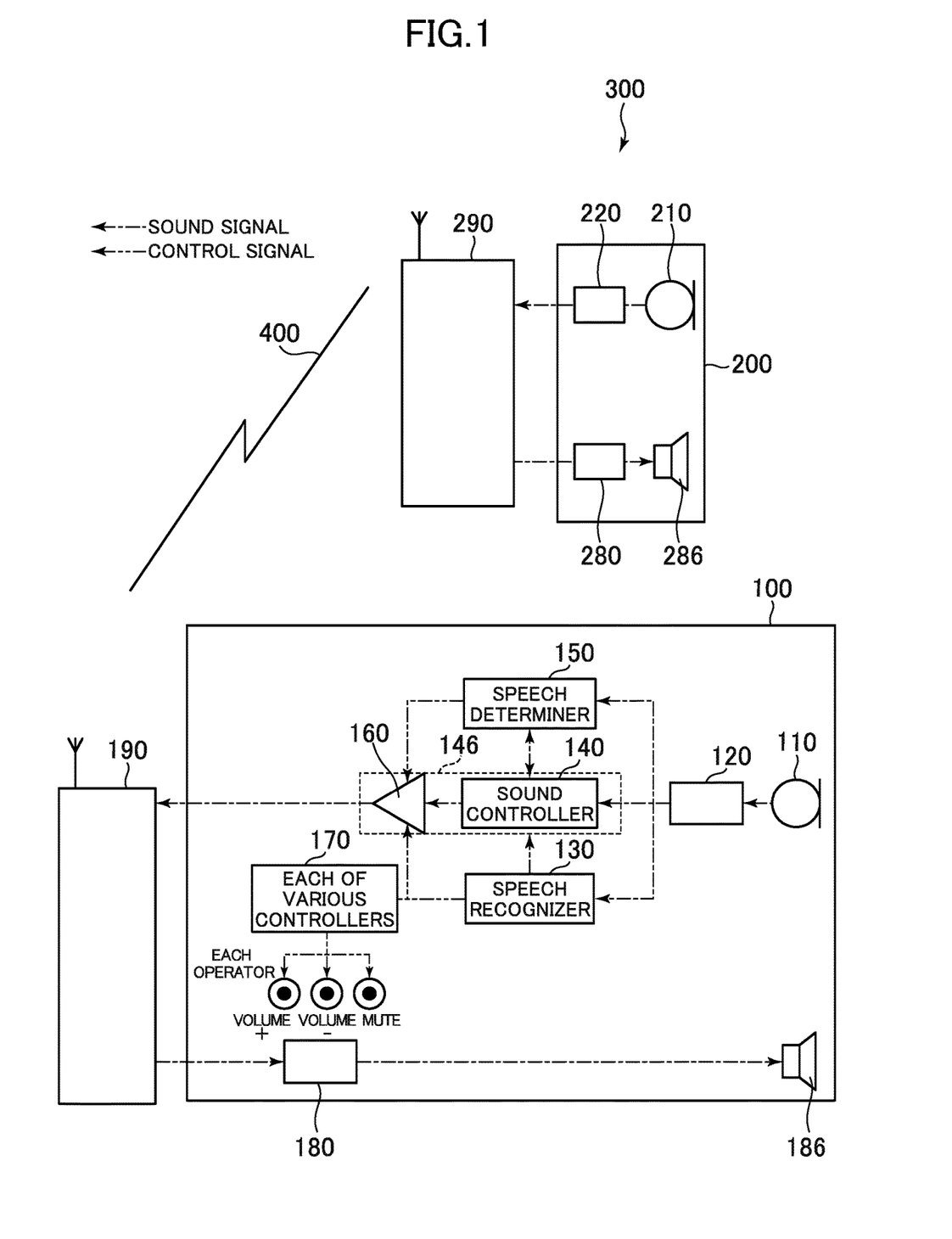
FIG. 1 is a conceptual diagram of a speech command generation system according to a first embodiment of the present disclosure.

FIG. 1 is a conceptual diagram of a speech command generation system 300 according to the first embodiment. As illustrated in FIG. 1, the speech command generation system 300 includes a first speech terminal 100 connected to a communication apparatus 190 and a second speech terminal 200 connected to a communication apparatus 290. The first speech terminal 100 and the second speech terminal 200 are arranged in different conference rooms. The first speech terminal 100 and the second speech terminal 200 transmit and receive various signals to/from each other through a network 400.

In this case, the speech command generation system 300 is used as, for example, a voice conference system. The voice conference system is not always required to be used for a conference as long as the voice conference system can be used by a plurality of users present in different places to communicate to/from each other.

[Network 400]

Examples of the network 400 include a wireless local area network (LAN), for example, Wireless-Fidelity (Wi-Fi) (trademark), a wired LAN, and a wide area network (WAN), and is used as a signal transmission path between the first speech terminal 100 and the second speech terminal 200.

[First Speech Terminal 100]

The first speech terminal 100 includes a sound pickup device 110 configured to pick up a speech of an utterer present in the conference room, in which the first speech terminal 100 is arranged, and to generate analog sound data. The analog sound data generated by the sound pickup device 110 is transmitted to an A/D converter 120 to be converted into digital sound data by the A/D converter 120. The digital sound data is transmitted to a speech recognizer 130, a sound controller 140, and a speech determiner 150, which are included in the first speech terminal 100. The first speech terminal 100 may omit the sound pickup device 110, and may be connected to the sound pickup device 110 arranged outside the first speech terminal 100.

[Speech Recognizer 130]

When receiving at least a leading part of a trigger word included in the digital sound data transmitted from the A/D converter 120, the speech recognizer 130 transmits, to the sound controller 140, a delay signal for instructing the sound controller 140 to delay output of the digital sound data. The trigger word refers to a keyword for instructing the sound controller 140 to generate a command signal from the sound data. The leading part of the trigger word refers to, for example, the first phoneme, the first syllable, the first mora, or the first word of the trigger word. The first embodiment is described by taking an exemplary configuration in which, when receiving the first phoneme of the trigger word included in the digital sound data transmitted from the A/D converter 120, the speech recognizer 130 transmits the delay signal for instructing the sound controller 140 to delay the output of the digital sound data to the sound controller 140.

The speech recognizer 130 also stores data for generating a command signal to be used for generating the command signal from the digital sound data. The speech recognizer 130 performs speech recognition processing on the digital sound data transmitted from the A/D converter 120 to generate text data from the digital sound data. The speech recognizer 130 generates the command signal through use of the text data generated in the speech recognition processing and the data for generating a command signal, which is stored in advance, and transmits the command signal to each of various controllers 170. The first embodiment has been described by taking the exemplary configuration in which the speech recognizer 130 stores the data for generating a command signal to generate the command signal. As another embodiment, a controller configured to generate the command signal may be separately provided outside the speech recognizer 130.

In addition, when receiving the trigger word, the speech recognizer 130 transmits to a command speech muter 160 a muting signal for switching the output of the digital sound data to a mute state.

[Sound Controller 140]

The sound controller 140 includes a delay function of delaying the output of the digital sound data transmitted from the A/D converter 120 based on the delay signal transmitted from the speech recognizer 130. When having delayed the output, the sound controller 140 also transmits to the speech determiner 150 delay information relating to the number of delayed packets. In addition, the sound controller 140 deletes a delayed packet of a silent part based on a silence compression instruction signal transmitted from the speech determiner 150, and performs silence compression described later. The sound controller 140 further transmits to the speech determiner 150 the delay information relating to the delayed packets that have been deleted. The sound controller 140 and the command speech muter 160, which is described later, form an output controller 146.

[Speech Determiner 150]

The speech determiner 150 has a function of determining whether or not the digital sound data relating to a speech of a person is being transmitted from the A/D converter 120.

The speech determiner 150 receives the above-mentioned delay information from the sound controller 140, and appropriately updates the number of delayed packets that have been accumulated. The speech determiner 150 determines that the sound data indicates a silent state in the case of the delayed packets that have been accumulated remain and the digital sound data on the speech of a person is not being transmitted from the A/D converter 120. The speech determiner 150 transmits to the sound controller 140 the silence compression instruction signal for instructing the sound controller 140 to perform the silence compression when it is determined that the sound data indicates the silent state.

In addition, when the silent state has elapsed for a period equal to or longer than a given fixed time period while the command speech muter 160 is in a mute state, the speech determiner 150 transmits to the command speech muter 160 a muting cancellation signal for bringing the output to an on state.

[Command Speech Muter 160]

The command speech muter 160 switches the output of the digital sound data transmitted from the sound controller 140 to a mute state based on the muting signal transmitted from the speech recognizer 130. Meanwhile, the command speech muter 160 switches the output of the digital sound data transmitted from the sound controller 140 to an on state based on the muting cancellation signal transmitted from the speech determiner 150.

The command speech muter 160 and the sound controller 140, which is described above, form the output controller 146.

[Communication Apparatus 190]

When the command speech muter 160 outputs the digital sound data, the communication apparatus 190 transmits the digital sound data to the communication apparatus 290 connected to the second speech terminal 200 through the network 400. The communication apparatus 190 also receives the digital sound data transmitted from the second speech terminal 200 through the network 400, and transmits the digital sound data to a D/A converter 180 included in the first speech terminal 100.

The communication apparatus 190 may be formed as, for example, a personal computer connected to the first speech terminal 100, or may be formed as a built-in component of the first speech terminal 100.

[D/A Converter 180]

The D/A converter 180 converts the digital sound data transmitted from the second speech terminal 200 into analog sound data. The analog sound data is output from a speaker 186 to enable a participant present in the conference room in which the first speech terminal 100 is arranged to hear a speech of an utterer present in the conference room in which the second speech terminal 200 is arranged.

The speaker 186 may be formed as a built-in component of the first speech terminal 100, or may be formed as a component externally connected to the first speech terminal 100.

[Various Controllers 170]

The various controllers 170 use the command signals transmitted from the speech recognizer 130 to perform various kinds of parameter control on the first speech terminal 100 to, for example, adjust a volume of the speaker 186 and switch whether or not to allow the sound pickup device 110 to receive input of a speech.

[Second Speech Terminal 200]

The second speech terminal 200 includes a sound pickup device 210 configured to pick up the speech of the utterer present in the conference room in which the second speech terminal 200 is arranged. The sound data on the utterer picked up by the sound pickup device 210 is transmitted to an A/D converter 220 to be converted into digital sound data by the A/D converter 220. The digital sound data is transmitted to the first speech terminal 100 by the communication apparatus 290 connected to the second speech terminal 200 through the network 400. The second speech terminal 200 may omit the sound pickup device 210, and may be connected to the sound pickup device 210 arranged outside the second speech terminal 200.

The communication apparatus 290 receives the digital sound data transmitted from the first speech terminal 100 through the network 400, and transmits the digital sound data to a D/A converter 280 included in the second speech terminal 200. The communication apparatus 290 may be formed as, for example, a personal computer connected to the second speech terminal 200, or may be formed as a built-in component of the second speech terminal 200.

The D/A converter 280 converts the digital sound data transmitted from the first speech terminal 100 into analog sound data. The analog sound data is output from a speaker 286 to enable a participant present in the conference room in which the second speech terminal 200 is arranged to hear a speech of an utterer present in the conference room in which the first speech terminal 100 is arranged.

The speaker 286 may be formed as a built-in component of the second speech terminal 200, or may be formed as a component externally connected to the second speech terminal 200.

[Control Method for First Speech Terminal]

Figure 2:
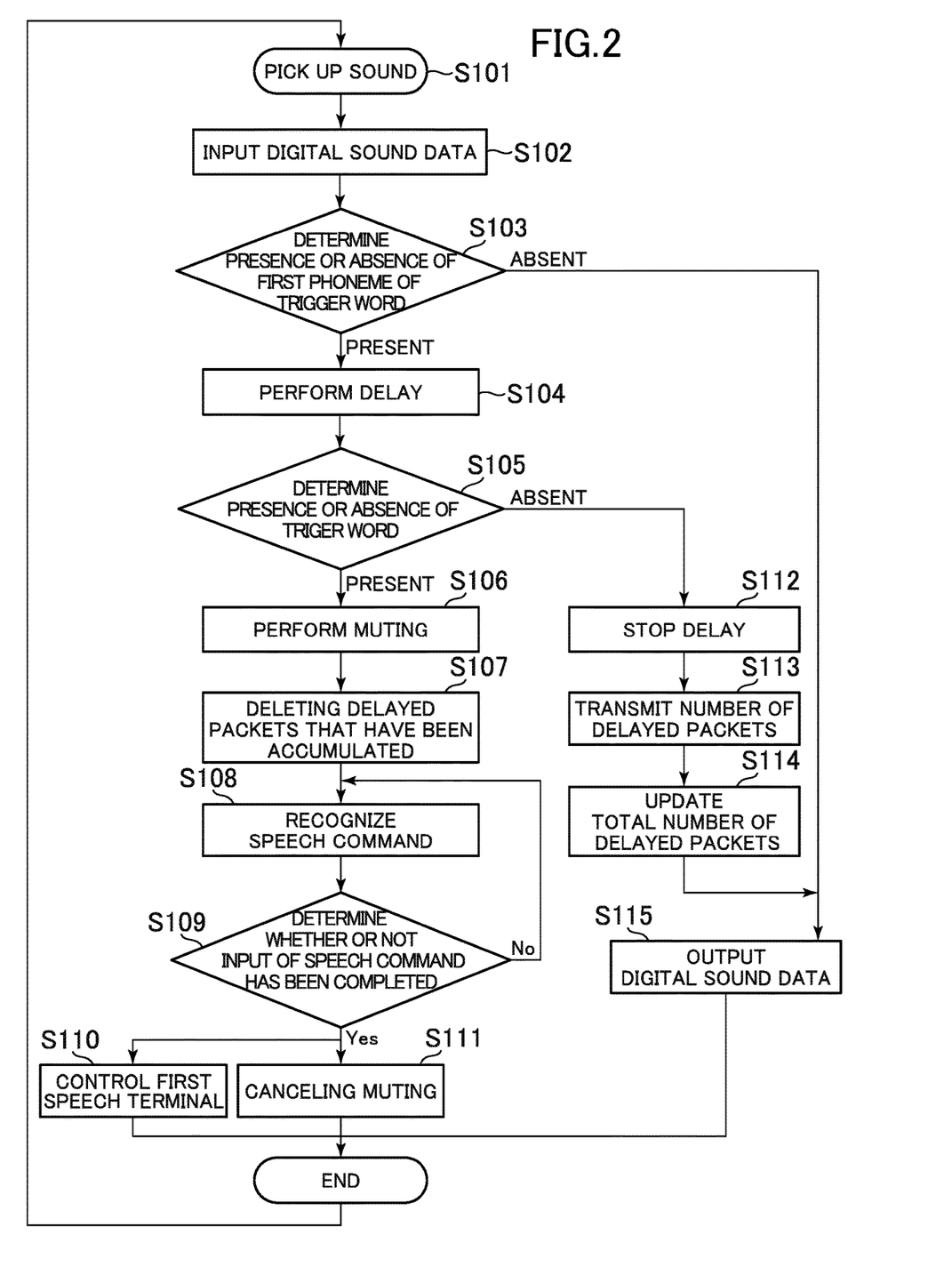
FIG. 2 is a flow chart for illustrating a control method for a first speech terminal according to each of the first embodiment and a second embodiment of the present disclosure.
Figure 3:
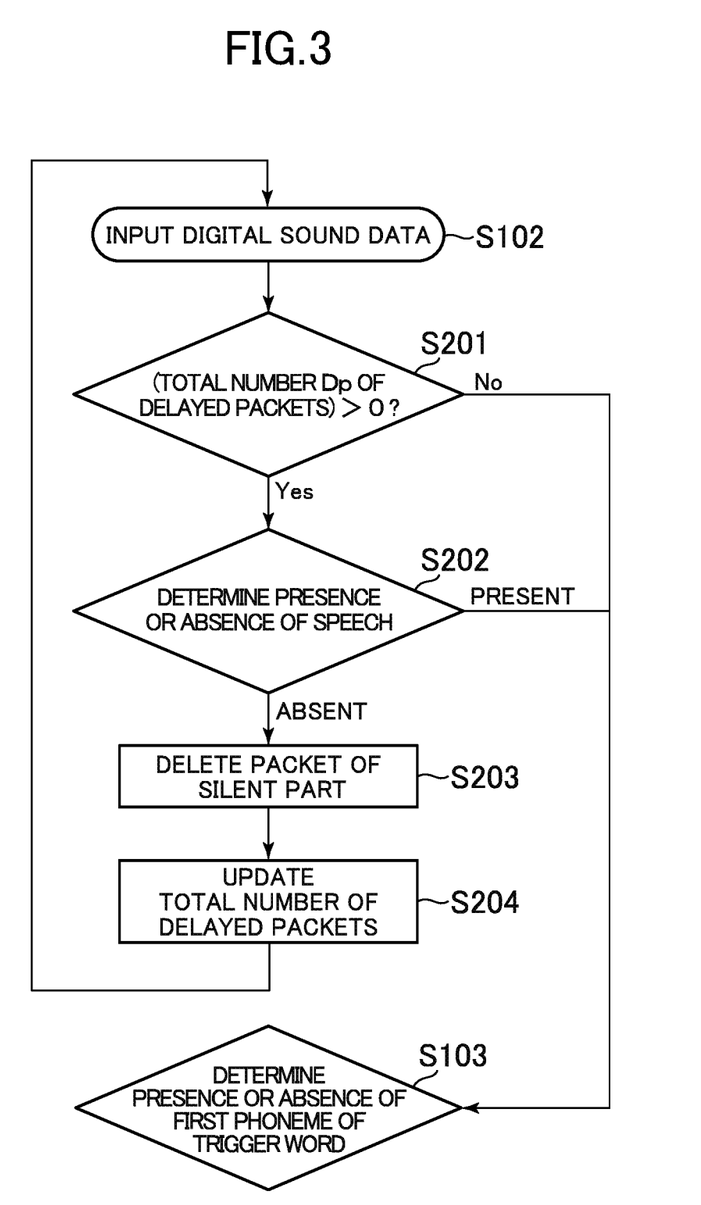
FIG. 3 is a flow chart for illustrating a silence compression method for the first speech terminal according to each of the first embodiment and the second embodiment.

FIG. 2 is a flow chart for illustrating a control method for the first speech terminal 100 according to the first embodiment. FIG. 3 is a flow chart for illustrating a silence compression method for the first speech terminal 100 according to the first embodiment. Now, a control method for the first speech terminal 100 according to the first embodiment is described with reference to FIG. 2 and FIG. 3.

[Step S101 of Picking Up Sound]

As illustrated in FIG. 2, Step S101 of picking up a sound is first performed. In Step S101 of picking up a sound, the sound pickup device 110 included in the first speech terminal 100 picks up the speech of the utterer present in the conference room in which the first speech terminal 100 is arranged to generate analog sound data.

[Step S102 of Inputting Digital Sound Data]

Subsequently, Step S102 of inputting digital sound data is performed. In Step S102 of inputting the digital sound data, the analog sound data generated by the sound pickup device 110 is transmitted to the A/D converter 120 to be converted into digital sound data by the A/D converter 120.

The digital sound data transmitted from the A/D converter 120 is input to the speech recognizer 130, the sound controller 140, and the speech determiner 150, which are included in the first speech terminal 100.

[Step S103 of determining Presence or Absence of First Phoneme of Trigger Word]

Subsequently, Step S103 of determining presence or absence of the first phoneme of a trigger word is performed. The trigger word refers to a keyword for causing the speech recognizer 130 to generate a command signal from the digital sound data, and examples thereof include "OK, (apparatus name)" and "Hey, (apparatus name)". The first phoneme of the trigger word is "OW" when the trigger word is "OK, (apparatus name)" (sequence of phonemes: OW K EY), and is "HH" when the trigger word is "Hey, (apparatus name)" (sequence of phonemes: HH EY).

First, the speech recognizer 130 converts the received digital sound data into text data. That is, the speech recognizer 130 performs speech recognition on the digital sound data. As a result, when the speech recognizer 130 recognizes the first phoneme of the trigger word in the text data generated from the received digital sound data, the speech recognizer 130 transmits to the sound controller 140 the delay signal for instructing the sound controller 140 to delay the output of the digital sound data. After the delay signal is transmitted, the control flow advances to Step S104 of performing delay. When the speech recognizer 130 fails to recognize the first phoneme of the trigger word, the control flow advances to Step S115 of outputting digital sound data, and the digital sound data output from the A/D converter 120 is output from the sound controller 140.

The first embodiment has been described by taking the example in which the speech recognizer 130 determines whether or not the first phoneme of the trigger word is included in the text data generated from the digital sound data, but the present disclosure is not limited to this example. For example, a method of the speech recognizer 130 determining whether or not the first and second phonemes of the trigger word are included in the digital sound data may be employed. In another case, a method of determining by the speech recognizer 130 whether or not a specific syllable, mora or word included in the trigger word is included in the digital sound data may be employed.

[Step S104 of Performing Delay]

Subsequently, Step S104 of performing the delay is performed. The sound controller 140 receives the delay signal for instructing the sound controller 140 to delay the output of the digital sound data, which has been transmitted from the speech recognizer 130, which has recognized the first phoneme of the trigger word. The sound controller 140, which has received the delay signal, delays the output of the digital sound data received from the A/D converter 120, and then outputs the digital sound data to the command speech muter 160. That is, the transmission of the digital sound data in the output controller 146 is delayed by the delay signal transmitted from the speech recognizer 130.

When performing the delay, the sound controller 140 also outputs the delay information relating to the number of delayed packets to the speech determiner 150 in Step S113 of transmitting the number of delayed packets, which is described later. This enables the speech determiner 150 to recognize how much delay has occurred up to now.

[Step S105 of Determining Presence or Absence of Trigger Word]

Even when the speech recognizer 130 determines that the first phoneme of the trigger word is included in the digital sound data in Step S103 of determining the presence or absence of the first phoneme of the trigger word, there is a possibility that a speech other than the trigger word and having only the first phoneme in common with the trigger word may have been uttered by the utterer. Therefore, in Step S105 of determining the presence or absence of the trigger word, the speech recognizer 130 determines whether or not the rest of the trigger word has been actually uttered following the first phoneme of the trigger word.

When the speech recognizer 130 recognizes the trigger word in the text data generated from the digital sound data, the speech recognizer 130 transmits the muting signal for bringing the output of the digital sound data to a mute state to the command speech muter 160. After that, the control flow advances to Step S106 of performing muting.

In addition, when the speech recognizer 130 fails to recognize the trigger word in the text data generated from the digital sound data, the speech recognizer 130 transmits to the sound controller 140 a delay stop signal for instructing the sound controller 140 to stop the delay. The control flow advances to Step S112 of stopping the delay.

In the first embodiment, Step S106 of performing the muting, which is performed when the speech recognizer 130 recognizes the trigger word, is first described, and Step S112 of stopping the delay is described later.

[Step S106 of Performing Muting]

In Step S106 of performing the muting, the command speech muter 160 receives the muting signal, which is a control signal for bringing the output of the digital sound data to a mute state, from the speech recognizer 130. The command speech muter 160, which has received the muting signal, brings the output of the digital sound data transmitted from the sound controller 140 to a mute state. The method of bringing the output to a mute state may be appropriately selected. For example, the output may be brought to a mute state by bringing the output to an off state or deleting the digital sound data cached in the command speech muter 160.

With such a control method, it is possible to achieve a configuration in which a speech used by the utterer to perform an operation by a speech command is not transmitted to the other person on the phone, namely, the second speech terminal 200.

After Step S106 of performing the muting is finished, the control flow advances to Step S107 of deleting the delayed packets that have been accumulated.

[Step S107 of Deleting Delayed Packets that have been Accumulated]

In Step S107 of deleting the delayed packets that have been accumulated, the sound controller 140 stops delaying the output of the digital sound data, and starts to output the digital sound data to the command speech muter 160 that has been brought to a mute state. The sound controller 140 also deletes all pieces of digital sound data that have been delayed since Step S104 of performing the delay.

With such a control method, it is possible to delete the delayed packets that have been accumulated since Step S104 of performing the delay. It is also possible to transmit the sound data on the utterer obtained after Step S111 of canceling the muting, which is described later, to the second speech terminal 200 almost in real time.

[Step S108 of Recognizing Speech Command]

Subsequently, the control flow advances to Step S108 of recognizing a speech command.

The speech recognizer 130 performs the speech recognition processing on the digital sound data transmitted from the A/D converter 120 to generate text data from the digital sound data. The speech recognizer 130 generates the command signal through use of the text data generated in the speech recognition processing and the data for generating a command signal, which is stored in advance.

The data for generating a command signal includes data relating to a plurality of phonemes (or syllables, morae, or words) and data for associating a command signal and a sequence of the plurality of phonemes (or syllables, morae, or words) with each other. The speech recognizer 130 performs a phoneme analysis (or syllable analysis, mora analysis, or word analysis) on the text data generated from the digital sound data, and extracts, from the data for generating a command signal, the data that matches, or is similar to, the sequence of phonemes (or syllables, morae, or words) obtained by the phoneme analysis, to thereby generate a command signal associated with this data.

Examples of the command signal generated by the speech recognizer 130 include a signal for instructing each of the various controllers 170 to adjust the volume of the speaker 186 or to switch whether or not to allow the sound pickup device 110 to receive the input of a speech. The speech recognizer 130 transmits the generated command signal to each of the various controllers 170.

The various controllers 170, which have received the command signals, use the command signals transmitted from the speech recognizer 130 to perform the parameter control on the first speech terminal 100, for example, to adjust the volume of the speaker 186 and to switch whether or not to allow the sound pickup device 110 to receive the input of a speech.

[Step S109 of Determining Whether or not Input of Speech Command has been Completed]

In Step S109 of determining whether or not the input of the speech command has been completed, the speech recognizer 130 or the speech determiner 150 determines whether or not the input of the speech command from the utterer has been completed or ended at some midpoint.

As a first example, when the speech recognizer 130 determines that the digital sound data received from the A/D converter 120 matches the data for generating a command signal provided in advance, the speech recognizer 130 determines that the input of the speech command has been completed. At this time, the control flow advances to Step S110 of controlling a first speech terminal and Step S111 of canceling the muting.

As a second example, when the speech determiner 150 determines that a state in which no digital sound data is being transmitted from the A/D converter 120, namely, the silent state, has continued for a period equal to or longer than a fixed time period, the speech determiner 150 determines that the input of the speech command from the utterer has been ended at some midpoint, and the control flow advances to Step S111 of canceling the muting.

While the speech recognizer 130 and the speech determiner 150 have not determined that the input of the speech command from the utterer has been completed or ended at some midpoint, the control flow returns to Step S108 of recognizing the speech command, and the speech recognizer 130 continues to perform the speech recognition.

[Step S110 of Controlling First Speech Terminal]

In Step S110 of controlling the first speech terminal, each of the various controllers 170, which has received the command signal, performs processing corresponding to the command signal.

For example, each of the various controllers 170 adjusts the volume of the speaker 186 or switches whether or not to allow the sound pickup device 110 to receive the input of a speech based on the command signal transmitted from the speech recognizer 130.

[Step S111 of Canceling Muting]

In Step S111 of canceling the muting, the speech determiner 150 or the speech recognizer 130 transmits the muting cancellation signal for canceling the muting of the command speech muter 160, which has been in a mute state since Step S106 of performing the muting. With this processing, the speech determiner 150 or the speech recognizer 130, which has determined that the input of the speech command from the utterer has been ended, cancels the muting of the command speech muter 160, to thereby be able to output the digital sound data relating to a subsequent speech from the utterer to the second speech terminal 200.

After Step S110 of controlling the first speech terminal and Step S111 of canceling the muting are finished, the control flow is brought to an end, and returns to Step S101 of picking up the sound.

[Step S112 of Stopping Delay]

Subsequently, Step S112 of stopping the delay is described. When the speech recognizer 130 fails to recognize the trigger word in the digital sound data in Step S105 of determining the presence or absence of the trigger word, the speech recognizer 130 transmits to the sound controller 140 the delay stop signal for instructing the sound controller 140 to stop the delay.

That is, when the trigger word is not included in the digital sound data, in order to achieve a voice conference with the second speech terminal 200 almost in real time, the delay of the sound controller 140, which has continued since Step S104 of performing the delay, is stopped.

[Step S113 of Transmitting Number of Delayed Packets]

Subsequently, the sound controller 140 executes Step S113 of transmitting the number of delayed packets. In Step S113 of transmitting the number of delayed packets, the sound controller 140, which stops the delay in Step S112 of stopping the delay, transmits to the speech determiner 150 the delay information relating to a number Dpn of delayed packets, which have been delayed since Step S104 of performing the delay until Step S112 of stopping the delay.

[Step S114 of Updating Total Number of Delayed Packets]

Subsequently, in Step S114 of updating the total number of delayed packets, the speech determiner 150, which has received the delay information relating to the number Dpn of delayed packets, adds Dpn to a total number Dp of delayed packets to update the total number Dp of delayed packets.

[Step S115 of Outputting Digital Sound Data]

The digital sound data output from the sound controller 140 passes through the command speech muter 160 to be transmitted to the communication apparatus 190. The communication apparatus 190 transmits the digital sound data to the communication apparatus 290 through the network 400. The communication apparatus 290 receives the digital sound data transmitted from the first speech terminal 100 through the network 400, and transmits the digital sound data to the D/A converter 280 included in the second speech terminal 200. The D/A converter 280 converts the digital sound data transmitted from the first speech terminal 100 into analog sound data. The analog sound data is output from a speaker 286 to enable a participant present in the conference room in which the second speech terminal 200 is arranged to hear the speech of the utterer present in the conference room in which the first speech terminal 100 is arranged.

After Step S115 of outputting the digital sound data is finished, the control flow is brought to an end, and returns to Step S101 of picking up the sound.

Through use of the silence compression method described below, a timing to communicate sound data between the first speech terminal 100 and the second speech terminal 200 can be much brought closer to real time.

[Silence Compression Method]

Now, the silence compression method to be performed by the first speech terminal 100 according to the present disclosure is described with reference to FIG. 3. The silence compression flow can be inserted between Step S102 of inputting the digital sound data and Step S103 of determining the presence or absence of the first phoneme of the trigger word, which are illustrated in FIG. 2.

[Step S201 of Determining Total Number of Delayed Packets]

After Step S102 of inputting the digital sound data is finished, the speech determiner 150 performs Step S201 of determining the total number of delayed packets.

In Step S201 of determining the total number of delayed packets, the speech determiner 150 determines whether or not the total number of delayed packets is larger than zero at a current time point.

When the total number of delayed packets is zero, it is not required to perform the silence compression, and hence the control flow advances to Step S103 of determining the presence or absence of the first phoneme of the trigger word, which has been described above with reference to FIG. 2.

When the total number of delayed packets is larger than zero, the control flow advances to Step S202 of determining presence or absence of a speech.

[Step S202 of Determining Presence or Absence of Speech]

In Step S202 of determining the presence or absence of a speech, the speech determiner 150 performs a frequency analysis on the digital sound data, to thereby discriminate the digital sound data between a mere noise and a human voice to determine whether or not a speech of a person has been uttered. As a specific example, the speech determiner 150 converts the digital sound data from a time domain into a frequency domain, and determines that digital sound data included in a predetermined range (for example, from 0.2 kHz to 4 kHz) appropriate as a frequency of a human voice is a human voice. Meanwhile, the speech determiner 150 determines that digital sound data that is not included in the predetermined range is noise.

When a speech of a person is included in the digital sound data, the silence compression cannot be performed, and hence the control flow advances to Step S103 of determining the presence or absence of the first phoneme of the trigger word.

When a speech of a person is not included in the digital sound data, the silence compression can be executed, and hence the control flow advances to Step S203 of deleting a packet of a silent part.

[Step S203 of Deleting Packet of Silent Part]

In Step S203 of deleting the packet of the silent part, the speech determiner 150 transmits to the sound controller 140 the silence compression instruction signal for instructing the sound controller 140 to perform the silence compression. The sound controller 140, which has received the silence compression instruction signal, deletes the packet of the silent part based on the silence compression instruction signal. The sound controller 140, which has deleted the packet of the silent part, transmits to the speech determiner 150 the delay information relating to a number Dpm of delayed packets that have been deleted.

[Step S204 of Updating Total Number of Delayed Packets]

The speech determiner 150, which has received the delay information relating to the number Dpm of delayed packets that have been deleted from the sound controller 140, performs Step S204 of updating the total number of delayed packets. In Step S204 of updating the total number of delayed packets, the speech determiner 150 subtracts Dpm from the total number Dp of delayed packets to update the total number Dp of delayed packets.

After that, the control flow advances to Step S102 of inputting the digital sound data. After that, the flow from Step S102 of inputting the digital sound data to Step S204 of updating the total number of delayed packets is repeatedly performed until "it is determined that the total number of delayed packets is zero in Step S201 of determining the total number of delayed packets" or "it is determined that a speech of a person is included in the digital sound data in Step S202 of determining the presence or absence of a speech".

Second Embodiment

A second embodiment of the present disclosure is described below with reference to the accompanying drawings. In the second embodiment, components common to the first embodiment are denoted by the same reference symbols, and descriptions thereof are omitted.

[Speech Command Generation System 300A]

Figure 4:
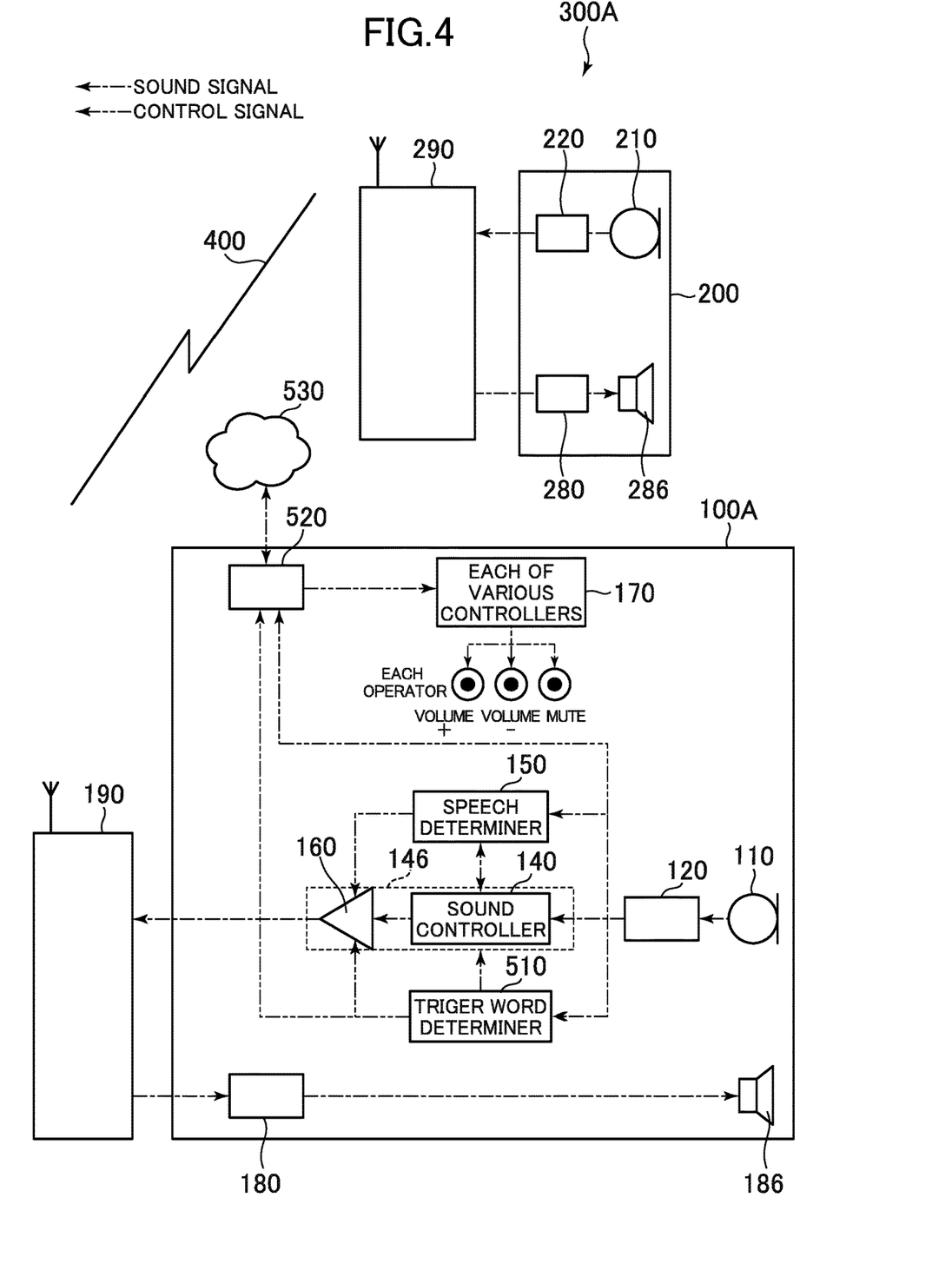
FIG. 4 is a conceptual diagram of a speech command generation system according to the second embodiment.

FIG. 4 is a conceptual diagram of a speech command generation system 300A according to the second embodiment. A first speech terminal 100A included in the speech command generation system 300A includes a trigger word determiner 510 and a network communication device 520 in place of the speech recognizer 130. The speech command generation system 300A is provided with a server 530. The digital sound data output from the A/D converter 120 is transmitted to the sound controller 140, the speech determiner 150, the trigger word determiner 510, and the network communication device 520.

[Trigger Word Determiner 510]

When receiving at least a leading part of a trigger word included in the digital sound data transmitted from the A/D converter 120, the trigger word determiner 510 transmits to the sound controller 140 a delay signal for instructing the sound controller 140 to delay output of the digital sound data.

Further, when receiving the trigger word, the trigger word determiner 510 transmits to the command speech muter 160 a muting signal for switching the output of the digital sound data transmitted from the sound controller 140 to a mute state.

In addition, when receiving the trigger word, the trigger word determiner 510 transmits to the network communication device 520 a control signal for instructing the network communication device 520 to transmit to the server 530 the digital sound data relating to a command speech uttered after the trigger word.

The trigger word determiner 510 is not required to store the data for generating a command signal to be used for generating a command signal from the digital sound data. That is, in the second embodiment, the trigger word determiner 510 performs the speech recognition processing for converting the digital sound data into text data in order to determine the presence or absence of the trigger word, but the text data generated in the speech recognition processing is not required to be used to generate a command signal.

The trigger word determiner 510 may avoid performing the speech recognition processing itself, and the server 530 described later may perform the speech recognition processing, while the trigger word determiner 510 may acquire the text data generated by the server 530 in the speech recognition processing through the intermediation of the network communication device 520 to determine the presence or absence of the trigger word through use of this text data.

[Network Communication Device 520]

The network communication device 520 transmits, to the server 530 provided outside the first speech terminal 100A, the digital sound data relating to the speech command received from the A/D converter 120 (text data generated from the digital sound data when the trigger word determiner 510 performs the speech recognition processing).

The network communication device 520 also receives the command signal transmitted from the server 530, and transmits the command signal to each of the various controllers 170. The network communication device 520 may be connected to the server 530 in any one of a wired manner and a wireless manner.

[Server 530]

The server 530 is, for example, a cloud server or an in-house server, and stores the data for generating a command signal to be used for generating a command signal from the digital sound data.

The server 530 receives the digital sound data transmitted from the network communication device 520, and performs the speech recognition processing on the digital sound data to generate text data. When the trigger word determiner 510 performs the speech recognition processing, the server 530 acquires the text data generated by the trigger word determiner 510 through the intermediation of the network communication device 520.

The server 530 generates a command signal through use of the above-mentioned data for generating a command signal and the text data generated from the digital sound data, and transmits this command signal to the network communication device 520.

In this manner, the server 530 having a command signal generation function is used, to thereby be able to achieve a configuration in which the trigger word determiner 510 does not store the data for generating a command signal to avoid generating a command signal.

The second embodiment has been described by taking an exemplary configuration in which the trigger word determiner 510 is included in the first speech terminal 100A, but the trigger word determiner 510 may be included in the server 530. When the trigger word determiner 510 is included in the server 530, the trigger word determiner 510 transmits and receives the sound data and various signals to/from the respective components included in the first speech terminal 100 through the intermediation of the network communication device 520.

[Control Method for First Speech Terminal 100A]

A control method for the first speech terminal 100A according to the second embodiment is different from the control method for the first speech terminal 100 according to the first embodiment in Step S108 of recognizing the speech command illustrated in FIG. 2. The other steps are the same as described above in the first embodiment with reference to FIG. 2 and FIG. 3, and hence descriptions thereof are omitted below.

The control to be performed by the speech recognizer 130 in the steps from Step S102 of inputting the digital sound data to Step S106 of performing the muting, Step S109 of determining whether or not the input of the speech command has been completed, and Step S112 of stopping the delay, which have been described in the first embodiment, is performed by the trigger word determiner 510 in the second embodiment. In addition, the expression "command signal transmitted from the speech recognizer 130" used in Step S110 of controlling the first speech terminal in the first embodiment is to be replaced by the expression "command signal transmitted from the network communication device 520" in the second embodiment.

Figure 5:
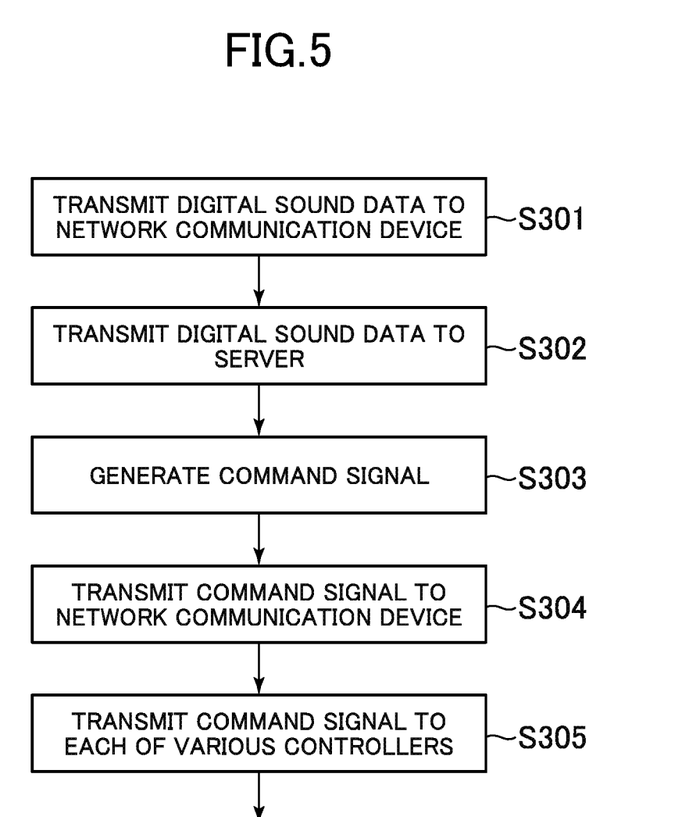
FIG. 5 is a flow chart for illustrating a speech recognition step for the first speech terminal according to the second embodiment.

In the second embodiment, Step S108 of recognizing the speech command is performed as five steps illustrated in FIG. 5. FIG. 5 is a flow chart for illustrating a speech recognition step for the first speech terminal 100A according to the second embodiment. Now, the speech recognition step for the first speech terminal 100A according to the second embodiment is described with reference to FIG. 5.

[Step S301 of Transmitting Digital Sound Data to Network Communication Device]

When determining that the trigger word is included in digital sound data received from the A/D converter 120, the trigger word determiner 510 performs Step S301 of transmitting the digital sound data to the network communication device 520. In this step, the trigger word determiner 510 transmits to the network communication device 520 the control signal for instructing the network communication device 520 to transmit to the server 530 the digital sound data relating to a command speech uttered after the trigger word. When the trigger word determiner 510 performs the speech recognition, the trigger word determiner 510 transmits the text data generated from the digital sound data to the network communication device 520 in Step S301.

[Step S302 of Transmitting Digital Sound Data to Server]

Subsequently, the network communication device 520 performs Step S302 of transmitting the digital sound data to the server. The network communication device 520 transmits the digital sound data relating to the speech command to the server 530 through the network 400.

[Step S303 of Generating Command Signal]

The server 530, which has received the digital sound data relating to the speech command from the network communication device 520, performs Step S303 of generating a command signal.

The server 530 is, for example, a cloud server or an in-house server, and stores the data for generating a command signal to be used for generating a command signal from the digital sound data.

The server 530 receives the digital sound data transmitted from the network communication device 520, and performs the speech recognition processing on the digital sound data to generate text data. When the trigger word determiner 510 performs the speech recognition processing, the server 530 acquires the text data generated by the trigger word determiner 510 through the intermediation of the network communication device 520. The server 530 generates a command signal through use of the above-mentioned data for generating a command signal and the text data generated from the digital sound data.

After that, the control flow advances to Step S304 of transmitting a command signal to a network communication device.

[Step S304 of Transmitting Command Signal to Network Communication Device]

The server 530, which has generated the command signal through use of the text data generated from the digital sound data, transmits the command signal to the network communication device 520 through the network 400.

After that, the control flow advances to Step S305 of transmitting a command signal to each of the various controllers.

[Step S305 of transmitting Command Signal to Each of Various Controllers]

The network communication device 520, which has received the command signal through the network 400, transmits the command signal to each of the various controllers 170.

The various controllers 170, which have received the command signals, uses the command signals transmitted from the server 530 to perform the parameter control on the first speech terminal 100 to, for example, adjust the volume of the speaker 186 and switch whether or not to allow the sound pickup device 110 to receive the input of a speech.

After that, the control flow advances to Step S109 of determining whether or not the input of the speech command has been completed, which has been described in the first embodiment.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A speech terminal comprising:
    an output controller including:
        a sound controller configured to acquire the sound data output from a sound pickup device; and
        a muter configured to acquire the sound data output from the sound controller to output the sound data to a communication apparatus; and
    a speech recognizer configured to:
        transmit to the sound controller a delay signal for delaying the output of the sound data;
        perform speech recognition on the sound data, in a state where the output of the sound data is delayed, and inhibit the output controller from outputting the sound data based on a result of the speech recognition; and
        transmit to the muter a muting signal for bringing the output of the sound data to a mute state.

2. The speech terminal according to claim 1, wherein the speech recognizer is configured to generate a command signal based on the speech recognition.

3. The speech terminal according to claim 2, wherein the speech recognizer is configured to store data for generating a command signal to be used for generating the command signal from the sound data.

4. The speech terminal according to claim 3, wherein the data for generating the command signal includes:
    data relating to a plurality of phonemes; and
    data for associating the command signal and a sequence of the plurality of phonemes with each other.

5. The speech terminal according to claim 2, wherein the speech recognizer is configured to transmit the command signal to each of various controllers.

6. The speech terminal according to claim 1, wherein the speech recognizer is configured to transmit the delay signal when at least a leading part of a trigger word included in the sound data is recognized, and transmit the muting signal when the trigger word included in the sound data is recognized.

7. The speech terminal according to claim 6, wherein the leading part of the trigger word includes at least any one of a first phoneme, a first syllable, a first mora, or a first word of the trigger word.

8. The speech terminal according to claim 6, wherein the speech recognizer is configured to transmit, when failing to recognize the trigger word after having recognized at least the leading part of the trigger word to transmit the delay signal, a delay stop signal for causing the sound controller to stop the delay of the output.

9. The speech terminal according to claim 1, further comprising a speech determiner configured to:
    acquire the sound data;
    determine that the sound data indicates a silent state when the sound data does not include a speech of a person; and
    transmit to the sound controller a control signal for instructing the sound controller to perform silence compression when the sound data is determined to indicate the silent state.

10. The speech terminal according to claim 9, wherein the sound controller is configured to delay, when receiving the delay signal, the output of the sound data, and transmit to the speech determiner delay information relating to a delayed packet of the sound data.

11. The speech terminal according to claim 10, wherein the sound controller is configured to delete the delayed packet of a silent part when receiving the control signal for instructing the sound controller to perform the silence compression.

12. The speech terminal according to claim 11, wherein the sound controller is configured to transmit to the speech determiner the delay information relating to the delayed packet that has been deleted.

13. The speech terminal according to claim 10, wherein the speech determiner is configured to receive the delay information to update a number of delayed packets that have been accumulated.

14. The speech terminal according to claim 13, wherein the speech determiner is configured to avoid, when the number of delayed packets that have been accumulated is zero, transmitting to the sound controller the control signal for instructing the sound controller to perform the silence compression.

15. The speech terminal according to claim 9, wherein the speech determiner is configured to perform a frequency analysis on the sound data to determine whether a speech of a person is included in the sound data.

16. The speech terminal according to claim 9, wherein the speech determiner is configured to transmit a muting cancellation signal for bringing the output to an on state to the muter when the silent state has elapsed for a period equal to or longer than a fixed time period.

17. The speech terminal according to claim 1, further comprising a sound pickup device configured to receive input of a speech to generate the sound data.

18. A speech command generation system comprising:
    a plurality of speech terminals, including first speech terminal and a second speech terminal communicable with each other,
    wherein at least one of the first or second speech terminal includes:
        an output controller including:
            a sound controller configured to acquire the sound data output from a sound pickup device; and
            a muter configured to acquire the sound data output from the sound controller to output the sound data to a communication apparatus; and
        a speech recognizer configured to:
            transmit to the sound controller a delay signal for delaying the output of the sound data;
            perform speech recognition on the sound data, in a state where the output of the sound data is delayed, and inhibit the output controller from outputting the sound data based on a result of the speech recognition; and
            transmit to the muter a muting signal for bringing the output of the sound data to a mute state.

* * * * *